United States Patent
Rousseau

(10) Patent No.: US 7,758,186 B2
(45) Date of Patent: Jul. 20, 2010

(54) OPHTHALMIC DISPLAY

(75) Inventor: Benjamin Rousseau, Charenton-le-Pont (FR)

(73) Assignee: Essilor Intl. (Compagnie Generale d'Optique), Charenton-le-Pont (FR)

( * ) Notice: Subject to any disclaimer, the term of this patent is extended or adjusted under 35 U.S.C. 154(b) by 238 days.

(21) Appl. No.: 12/085,052

(22) PCT Filed: Dec. 1, 2006

(86) PCT No.: PCT/FR2006/051268

§ 371 (c)(1),
(2), (4) Date: May 14, 2008

(87) PCT Pub. No.: WO2007/068838

PCT Pub. Date: Jun. 21, 2007

(65) Prior Publication Data

US 2010/0097567 A1     Apr. 22, 2010

(30) Foreign Application Priority Data

Dec. 13, 2005  (FR)  .................................. 05 53846

(51) Int. Cl.
G02C 1/00 (2006.01)
(52) U.S. Cl. ...................... 351/158; 351/140; 359/630
(58) Field of Classification Search ................... 351/41, 351/121, 140, 158; 349/13, 14; 359/629–631
See application file for complete search history.

(56) References Cited

U.S. PATENT DOCUMENTS

| 5,151,722 | A | * | 9/1992 | Massof et al. ............... 351/158 |
| 5,886,822 | A | | 3/1999 | Spitzer ....................... 359/630 |
| 6,092,896 | A | | 7/2000 | Chao et al. .................... 351/47 |
| 6,139,141 | A | | 10/2000 | Zider et al. .................... 351/47 |
| 2002/0089639 | A1 | * | 7/2002 | Starner et al. ................. 351/57 |
| 2004/0240072 | A1 | * | 12/2004 | Schindler et al. ............ 359/631 |

FOREIGN PATENT DOCUMENTS

WO   WO 2004/083941   *   9/2004   .................. 351/47

* cited by examiner

Primary Examiner—Huy K Mai
(74) Attorney, Agent, or Firm—Sofer & Haroun, LLP

(57) ABSTRACT

The invention relates to an ophthalmic display comprising:
a generator system for generating light beams;
an optical imager for shaping light beams emitted by a miniature screen of said light beam generator system, which beams are introduced into said imager via an inlet face, and for directing said beams towards the eye of a wearer in order to enable an image to be viewed;
an adapter in a reference position relative to said imager; and
a connection arrangement carried by said light beam generator system for connection to said adapter, the connection between said system and said adapter being releasable.

According to the invention, said adapter is constituted by at least two magnets for co-operating by the magnetic effect and by interengagement with at least two magnets carried by said connection arrangement.

9 Claims, 4 Drawing Sheets

OPHTHALMIC DISPLAY

RELATED APPLICATIONS

This application is a National Phase application of PCT/FR2006/051268, filed on Dec. 1, 2006, which in turn claims the benefit of priority from French Patent Application No. 05 53846, filed on Dec. 13, 2005, the entirety of which is incorporated herein by reference.

FIELD OF THE INVENTION

The present invention relates to an ophthalmic display comprising an optical imager that is preferably associated with the lens and that serves to project information of the image or multimedia type. The term "lens" is used herein to designate an optical system, in particular one that is suitable for positioning in an eyeglass frame.

BACKGROUND

U.S. Pat. No. 5,886,822 discloses an ophthalmic lens presenting a projection insert. Such a projection insert is constituted by an optical imager for shaping light beams from an electronic and optical system for generating light beams from an electronic signal, of the miniature screen, laser diode, or light-emitting diode (LED) type. The optical imager directs the light beams towards the eye of the wearer so as to enable the information content thereof to be viewed.

An example of a known display is shown diagrammatically in greater detail in FIG. 1.

By way of example, the optical imager is of the same type as that described in above-mentioned U.S. Pat. No. 5,866,822.

An electronic signal carrying information is taken to a miniature screen 1 by a cable 7. Using this signal, the miniature screen 1, illuminated by a back projector, generates a pixellized image corresponding to the information. By way of example, it is possible to use a "Kopin Cyberdisplay 320 color" screen that generates 320×240 pixels and that has dimensions of 4.8 millimeters (mm)×3.6 mm. The screen 1 is put in a referenced position relative to the optical imager 5 by means of a mechanical interface. A protective housing protects all or part of the assembly. Optical components 8, here a mirror and a lens, are associated with the screen 1.

That optical imager 5 also includes a propagation prism 5a, a counter-prism 5b, a quarterwave plate 5c, and a spherical Mangin mirror 5d. A spherical Mangin mirror is a plano-spherical lens in which the spherical face has been made reflective by aluminum or equivalent treatment.

The imager 5 also has polarization separation treatment 6 that can be implemented in the form of depositing thin layers, either on the propagation prism 5a, or on the counter-prism 5b, or by means of a film adhesively bonded between two of the above-mentioned elements.

That imager 5 is embedded in a lens 9 and the housing faces the rear of the lens, with reflecting treatment 5e then being included in the lens. On the same principle, the housing could be disposed to one side of the lens 9, in which the reflecting element 5e is omitted.

The word "lens" is used more particularly for an optionally correcting eyeglass that is designed to be mounted in an eyeglass frame. The ophthalmic eyeglass lens presents conventional functions such as correcting eyesight, and antireflection, antidirtying, antiscratching, treatments, for example.

It is known to fasten the light beam generator system on the lens and also to enable focusing to be adjusted by adjusting the distance at which the information image is viewed, and consequently by setting the viewing distance appropriately to enable the wearer to see a sharp image comfortably by means of the following arrangement. The lens is secured to an adapter constituted by a plate carrying two rods on which the housing of the light beam generator system is slidably engaged. During this adjustment, the housing is engaged to a greater or lesser extent on the slides so as to adjust its distance, and then it is locked in place by a transverse screw.

That type of connection and focus-adjusting device raises the following technical problems.

Depending on the extent to which the housing is engaged, the overall size of the display varies. This can lead to constraints in how it is made.

That type of device inevitably leads to a large amount of slack between the rods and the slides, and that is harmful to the accuracy of the display.

In general, the housing is made of plastics material, while the plate and its rods are made of metal. This results in the housing wearing quickly, thereby further increasing slack and inaccuracy of the housing.

Finally, in that prior art, adjustment is performed manually, in the sense that the wearer needs to take hold of the housing and slide it on the rods until a good focus is obtained. Naturally, such an arrangement is not very accurate and is not very comfortable to use, and in particular it is poorly adapted to everyday use, as opposed to experimental use.

Consequently, it can be envisaged to make a display fitted with a focus-adjustment device operating by adjusting the length of the light beams between the optical elements and the imager, with said adjustment device being included in the light beam generator system, the light beam generator system comprising for example a stationary plate to which at least one of the optical elements is connected via a movable connection that is adjustable by means of an actuator device.

Consequently, the connection between the light beam generator system to the lens does not need to enable distance to be adjusted, but does need to be relatively discreet on the lens for reasons of appearance, while also serving to provide accurate positioning and retention, and also being easier to use.

For this purpose, the invention provides an ophthalmic display comprising:

a generator system for generating light beams;

an optical imager for shaping light beams emitted by a miniature screen of said light beam generator system, which beams are introduced into said imager via an inlet face, and for directing said beams towards the eye of a wearer in order to enable an image to be viewed;

an adapter in a reference position relative to said imager; and a connection arrangement carried by said light beam generator system for connection to said adapter, the connection between said system and said adapter being releasable;

the display being characterized in that said adapter is constituted by at least two magnets for co-operating by the magnetic effect and by interengagement with at least two magnets carried by said connection arrangement.

The advantage of this type of solution lies in it being well adapted to engaging a light beam generator system on a lens of information eyeglasses while complying with severe constraints mechanically, optically, and in terms of size, weight, and appearance.

The number of parts used is minimized. It can be used without any external tool, swiftly, and easily. The absence of rubbing parts ensures that positioning accuracy is conserved.

From the point of view of appearance, the residual parts on the information eyeglass lens, i.e. the two magnets, are very discreet. The overall size of the connection system is minimal, both within the light beam generator system and on the lens. Its contribution to total weight is minimal, given that the parts dedicated solely to connection are the magnets.

OBJECTS AND SUMMARY OF THE INVENTION

In a preferred embodiment, magnets of a first type are cylindrical, each presenting an end with a determined pole.

Under such circumstances, and advantageously, magnets of a second type for co-operating with said magnets of the first type each comprise a tubular wall and presents at one end an opening, and at an opposite end a closed end wall, each magnet of the second type being designed to receive said end of a magnet of the first type engaged in said opening.

Advantageously, said end wall of a magnet of the second type is of polarity different from the polarity of said end of a magnet of the first type.

Preferably, said tubular wall of a magnet of the second type is identical in polarity to the polarity of said end of a magnet of the first type.

Said adapter may be made up of magnets of the first type and said connection arrangement may be made up of magnets of the second type.

Advantageously, said imager is integrated in a lens.

Said magnets of the adapter may be adhesively bonded to the surface of said lens or they may be integrated partially within said lens.

BRIEF DESCRIPTION OF THE DRAWINGS

The invention is described below in greater detail with the help of figures that merely show a preferred embodiment of the invention.

DETAILED DESCRIPTION

Figure 1:
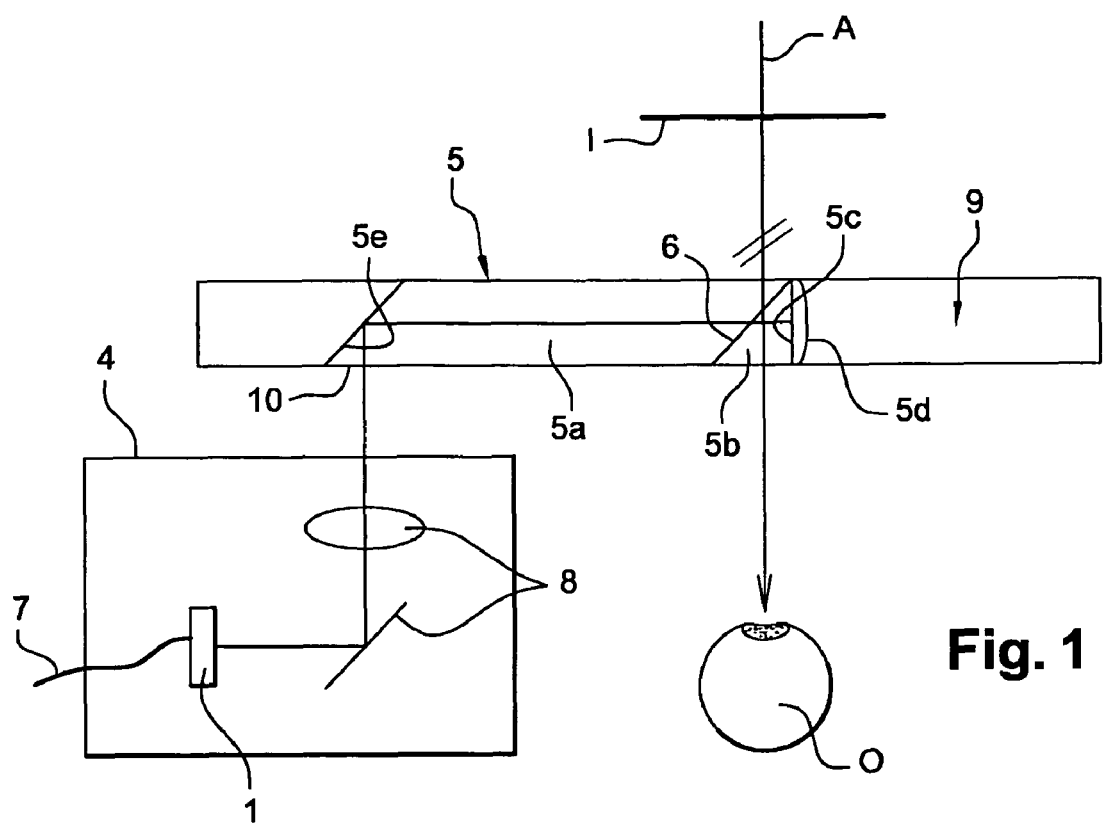
FIG. 1 is a diagrammatic plan view of a prior art display, and it is described above.
Figure 2:
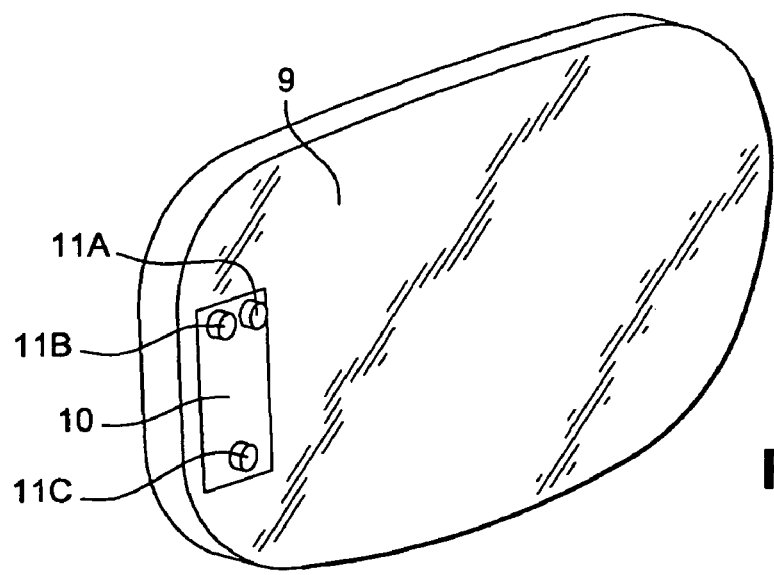
FIG. 2 is a fragmentary perspective view of an ophthalmic display in accordance with the invention.
Figure 3:
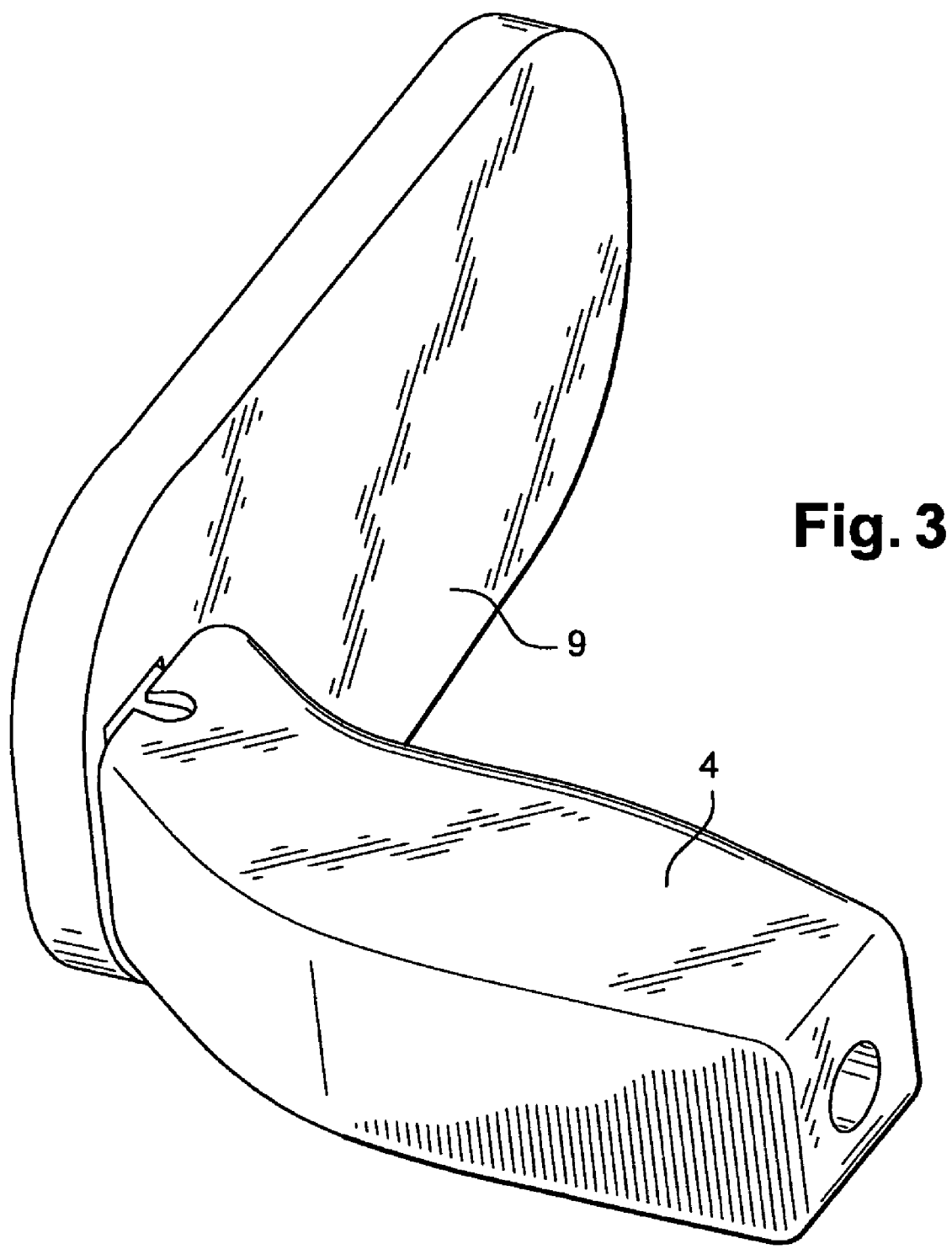
FIG. 3 is a perspective view of an ophthalmic display in accordance with the invention.

FIGS. 2 and 3 show a lens 9 constituted by an optionally correcting eyeglass, for mounting in an eyeglass frame. As shown in FIG. 1, the lens 9 has inserted therein an optical imager 5 with only its inlet face 10 for light beams being visible in FIG. 2.

An adapter is put into a reference position relative to the imager, i.e. it is secured to the imager or to the lens in accurate manner so as to ensure that light beams are transmitted correctly and well into the imager for propagation to the eye 0 of the wearer so as to enable an image I to be viewed.

These light beams are emitted from a miniature screen of a light beam generator system 4 that is shown in FIG. 3 and that includes an arrangement for connection to the adapter, the connection between the generator system and the adapter being releasable.

Figure 4:
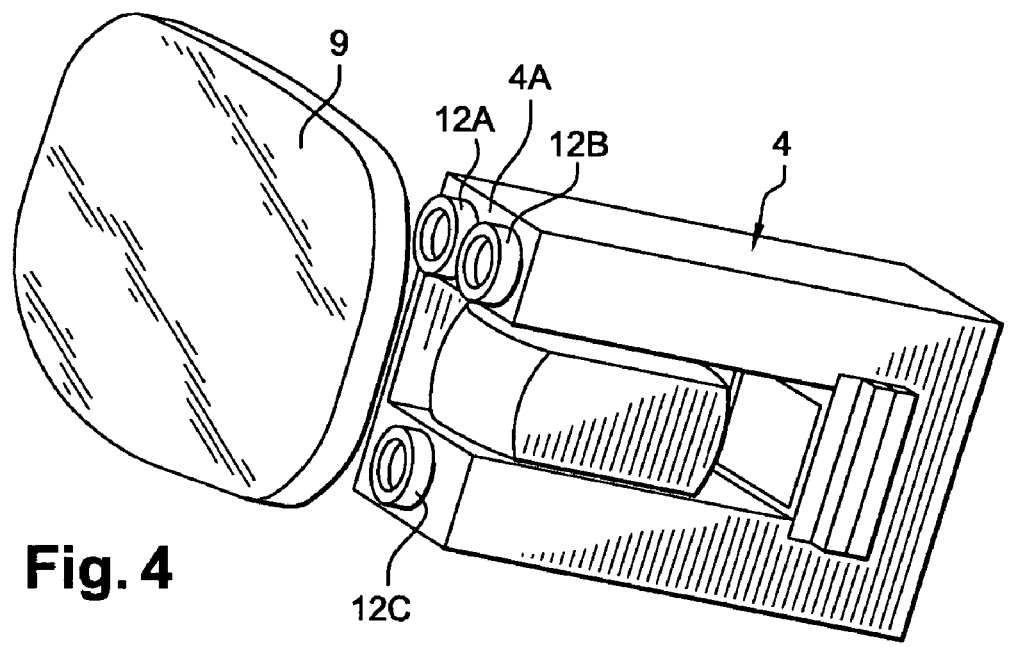
FIGS. 4 and 5 are diagrammatic views of an ophthalmic display in accordance with the invention.
Figure 5:
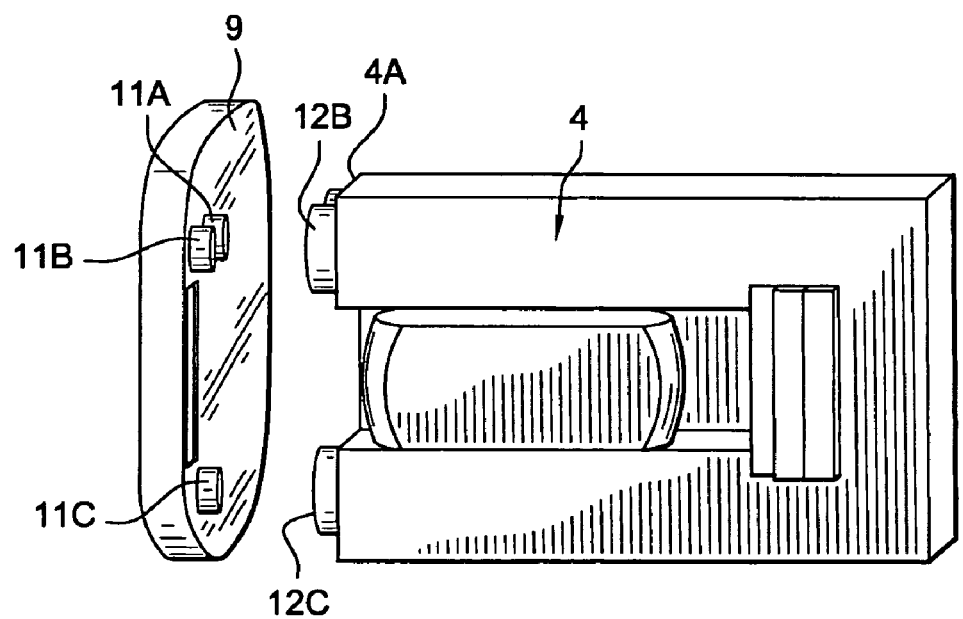

As can be seen in FIGS. 4 and 5, the adapter is constituted by at least two magnets, here three magnets 11A, 11B, and 11C, for co-operating by the magnetic effect and by interengagement with at least two magnets, here likewise three magnets 12A, 12B, 12C, carried by the connection arrangement carried by the generator system 4.

Figure 6:
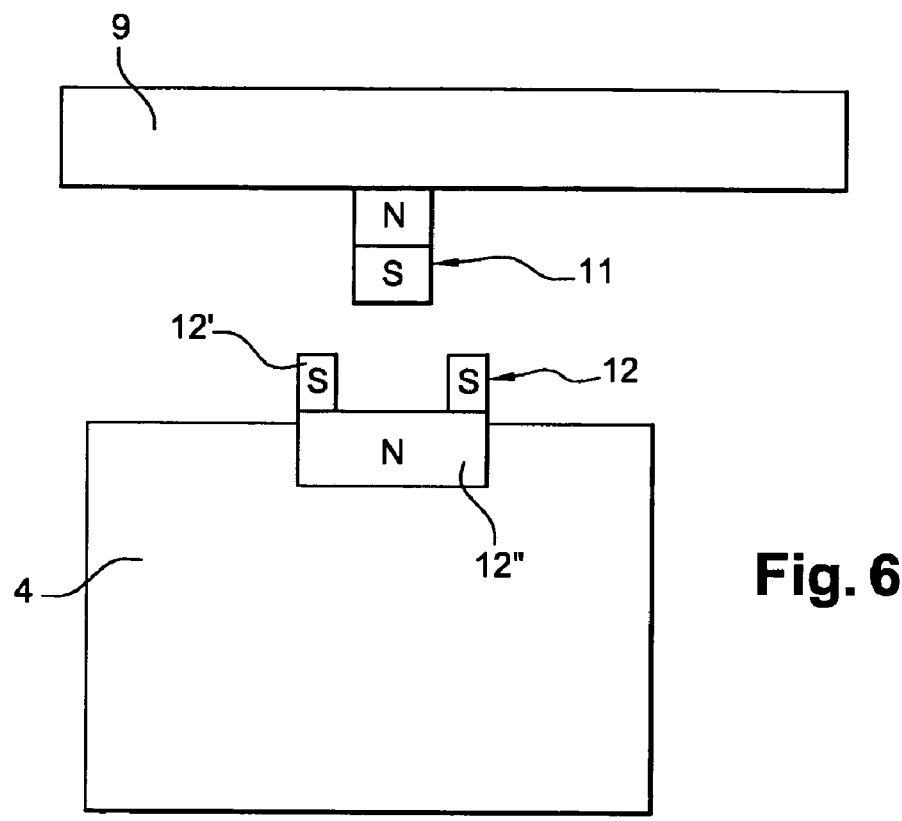
FIGS. 6 and 7 are section views showing a detail of an ophthalmic display in accordance with the invention.
Figure 7:
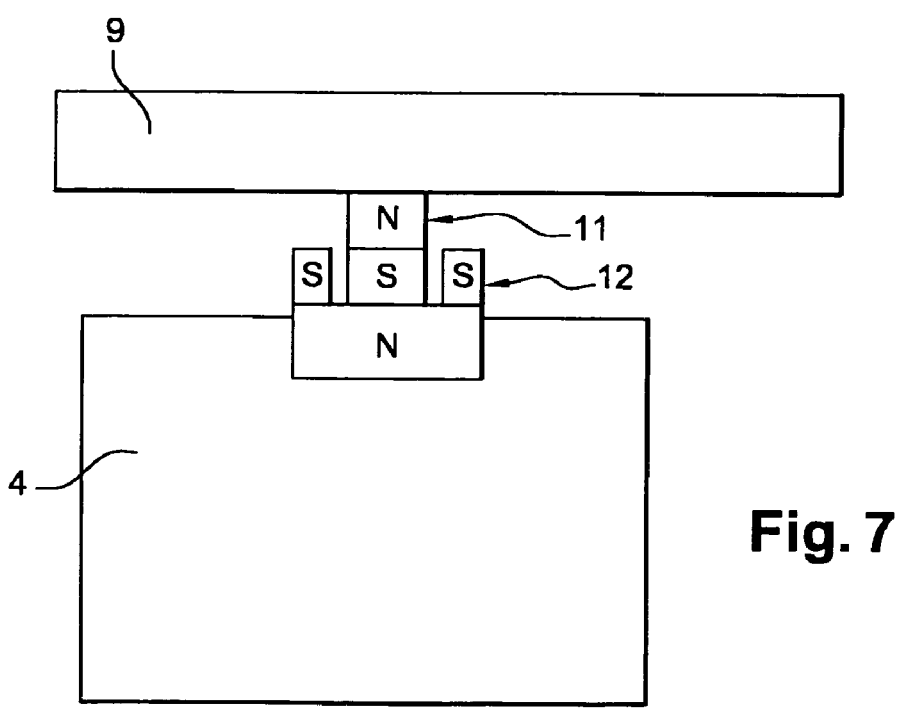

In the embodiment shown, the adapter is constituted by magnet of a first type 11, and the connection arrangement by magnets of a second type 12. These magnets are also shown in FIGS. 6 and 7.

Each magnet of the first type 11 is cylindrical and presents an end with a determined pole, which is south in the example shown.

Each magnet of the second type 12 has a tubular wall 12' and presents at one of its ends an opening and at its other end a closed end 12". Each magnet of the second type 12 is designed to receive the end of a corresponding magnet 11 of the first type engaged in its opening, as shown in FIG. 7.

The closed end 12" of a magnet of a second type is of polarity that is different from the polarity of the end of the magnet 11 of the first type, i.e. north in the example shown. In contrast, the tubular wall 12' of a magnet of the second type is of polarity that is identical to the polarity of the end of a corresponding magnet of the first type. The wall 12' thus presents south polarity while the end wall 12' presents north polarity in the example shown.

The magnets of the first type are machined. The magnets of the second type may also be machined, or they may be made by adhesively bonding a disk constituting the end wall 12" to a tube.

The magnets are preferably made of samarium-cobalt 5, of samarium-cobalt 17, or of neodymium-iron-boron.

The diameter of the magnets may be about 1 mm to 5 mm.

By virtue of this arrangement of interengaging magnets, a very small number of simple parts serve both to provide a retention function and a centering function.

Because of the opposite polarities of the engaged end of the magnet of the first type and the end wall 12' of the magnet of the second type, those two portions attract each other and serve to hold the two portions in position, and thus serve to hold the generator system 4 on the lens 9.

Because of the identical polarity of the engagement end of the magnet of the first type and of the wall 12' of the magnet of the second type, those two portions repel and also provide automatic centering of the magnet of the first type in the magnet of the second type.

In the embodiment described above, the adapter carried by the lens is constituted by magnets of the first type 11 and the connection arrangement carried by the generator system 4 is constituted by magnets of the second type 12. Still in the context of the invention, the arrangement could be inverted, i.e. the adapter could be made of magnets of the second type 12 and the connection arrangement could be made of magnets of the first type 11. It is even possible to envisage fitting the adapter with magnets of the first type and with magnets of the second type and for the generator system to be fitted with co-operating magnets corresponding to said magnets.

In the example shown, the magnets are of circular cross-section. They may be of some other cross-section, for example square.

In the example shown, the imager is integrated with a lens 9 of a pair of eyeglasses. The magnets of the adapter carried thereby may be bonded to the surface of the lens by adhesive or they may be partially embedded in the lens, with a portion of the magnets then being anchored in the lens.

The invention claimed is:

1. An ophthalmic display comprising:
   a generator system for generating light beams;
   an optical imager for shaping light beams emitted by a miniature screen of said light beam generator system, which beams are introduced into said imager via an inlet face, and for directing said beams towards the eye of a wearer in order to enable an image to be viewed;
   an adapter in a reference position relative to said imager; and
   a connection arrangement carried by said light beam generator system for connection to said adapter, the connection between said system and said adapter being releasable;
   wherein said adapter is constituted by at least two magnets for co-operating by the magnetic effect and by interengagement with at least two magnets carried by said connection arrangement.

2. A display according to claim 1, wherein magnets of a first type are cylindrical, each presenting an end with a determined pole.

3. A display according to claim 2, wherein magnets of a second type for co-operating with said magnets of the first type each comprise a tubular wall and presents at one end an opening, and at an opposite end a closed end wall, each magnet of the second type being designed to receive said end of a magnet of the first type engaged in said opening.

4. A display according to claim 3, wherein said end wall of a magnet of the second type is of polarity different from the polarity of said end of a magnet of the first type.

5. A display according to claim 3, wherein said tubular wall of a magnet of the second type is identical in polarity to the polarity of said end of a magnet of the first type.

6. A display according to claim 2, wherein said adapter is made up of magnets of the first type and said connection arrangement is made up of magnets of the second type.

7. A display according to claim 1, wherein said imager is integrated in a lens.

8. A display according to claim 7, wherein said magnets of the adapter are adhesively bonded to the surface of said lens.

9. A display according to claim 7, wherein said magnets of the adapter are partially integrated in said lens.

* * * * *